(12) United States Patent
Inoue

(10) Patent No.: US 6,800,356 B2
(45) Date of Patent: Oct. 5, 2004

(54) MAGNETIC RECORDING MEDIUM

(75) Inventor: Noriko Inoue, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/384,672

(22) Filed: Mar. 11, 2003

(65) Prior Publication Data

US 2003/0170498 A1 Sep. 11, 2003

(30) Foreign Application Priority Data

Mar. 11, 2002 (JP) .................................... P.2002-065445

(51) Int. Cl.$^7$ .............................................. G11B 5/735
(52) U.S. Cl. ........................ 428/141; 428/323; 428/329; 428/336; 428/694 BB
(58) Field of Search .................. 428/141, 323, 428/329, 336, 694 BB

(56) References Cited

U.S. PATENT DOCUMENTS 6,645,648 B2 * 11/2003 Doushita et al. ...... 428/694 BH

FOREIGN PATENT DOCUMENTS

| JP | 10-302243 | 11/1998 |
|---|---|---|
| JP | 2000-40218 | 2/2000 |

* cited by examiner

Primary Examiner—Stevan A. Resan
(74) Attorney, Agent, or Firm—Sughrue Mion, PLLC

(57) ABSTRACT

A magnetic recording medium comprising: a magnetic layer comprising a ferromagnetic powder and a binder; a non-magnetic support; and a backcoating layer comprising a non-magnetic powder and a binder, in this order, wherein the backcoating layer comprises 0.3 to 5% by weight of at least one of a fatty acid having 10 to 26 carbon atoms and an ester thereof, the backcoating layer has projections having a height of 100 nm or smaller as measured with an atomic force microscope, and a density of projections on the back-coating layer which have a height of 25 to 100 nm as measured with an atomic force microscope is 1000 or fewer per 90 $\mu$m side square.

14 Claims, No Drawings

MAGNETIC RECORDING MEDIUM

FIELD OF THE INVENTION

This invention relates to a magnetic recording medium for high-density recording and reproduction more particularly, it relates to a magnetic recording medium having high durability in a reproduction system using a magnetoresistive (MR) head.

BACKGROUND OF THE INVENTION

A floppy disk drive accepting MF-2HD floppy disks is preinstalled on today's personal computers. As the volume of data to be processed, such as imaging data, is drastically increasing, the capacity of an MF-2HD floppy disk has now come to be seen as insufficient. Magnetic disks of much larger capacity than predecessors have been awaited.

In the field of magnetic tapes, too, the recent spread of office computers such as minicomputers, personal computers, and work stations has boosted studies on magnetic tapes for storing computer data as an external memory medium (i.e., backup tapes). Before magnetic tapes for this application are developed for practical use, it is keenly required to improve recording capacity of magnetic tapes for achieving high-capacity recording and medium size reduction particularly for coping with the trend toward miniaturization and data processing power enhancement of computers.

Widespread magnetic recording media comprise a non-magnetic support having provided thereon a magnetic layer containing a magnetic substance, such as iron oxide powder, Co-doped iron oxide powder, $CrO_2$ powder, ferromagnetic metal powder, or hexagonal ferrite powder, dispersed in a binder. Recently, a magnetoresistive (MR) head has come to be used for a hard disk drive in a system using a flexible recording medium. Because an MR head has high sensitivity to provide sufficient reproduction output, combination of an MR head and fine magnetic particles with a relatively low saturation magnetization as realizes noise reduction, leading to a high C/N ratio. For example, JP-A-10-302243 (the term "JP-A" as used herein means an "unexamined published Japanese patent application") discloses a magnetic recording medium containing fine barium ferrite (BaFe) particles which is adapted to use in a reproduction system with an MR head.

In addition to the use of an MR head for reproduction, it is necessary in a high recording density (particularly linear recording density) system to optimize the relationship between recording conditions and a medium. In high linear density recording, the recording head gap is usually made smaller so as to reduce the influences of recording demagnetization and bit-shift. This, however, narrows the recording magnetic field, which, in turn, impairs the overwriting performance and increases thickness loss. Further, since the magnetization reversal width becomes narrower, the influence of magnetization disturbance in the magnetization transfer region is no more negligible, resulting in S/N loss.

SUMMARY OF THE INVENTION

With the ever-increasing recording density of magnetic recording media, improvements in running stability and durability of the media have been subjects to be addressed. To accomplish the subjects, JP-A-2000-40218 proposes a magnetic recording medium having specific depressions on both the magnetic layer and the backcoating layer.

An object of the present invention is to provide a magnetic recording medium having satisfactory electromagnetic characteristics and excellent durability particularly in high-density recording regions.

As a result of extensive investigation, the present inventors have found that the above object is accomplished by a magnetic recording medium having a backcoating layer which contains a specific amount of a lubricant and has projections in a specific range of profile.

The present invention provides a magnetic recording medium having a magnetic layer containing a ferromagnetic powder and a binder on a non-magnetic support and a backcoating layer containing a non-magnetic powder and a binder on the opposite side of the non-magnetic support, wherein the backcoating layer contains 0.3 to 5% by weight of at least one of a fatty acid having 10 to 26 carbon atoms and an ester thereof, the backcoating layer has projections having a height of 100 nm or smaller as measured with an atomic force microscope (AFM), and the density of projections on the backcoating layer which have a height of 25 to 100 nm as measured with an AFM is 1000 or fewer per 90 $\mu$m side square.

The present invention provides preferred embodiments of the magnetic recording medium, in which (1) the backcoating layer has a thickness of 0.1 to 1.0 $\mu$m and/or (2) the non-magnetic powder of the backcoating layer has an average particle size of 5 to 300 nm, and the backcoating layer contains an electrically conductive powder having an average particle size of 10 to 150 nm.

DETAILED DESCRIPTION OF THE INVENTION

The magnetic recording medium of the present invention is of the type which has a backcoating layer containing a non-magnetic powder and a binder on the backside of a non-magnetic support and is characterized by a specific design of the backcoating layer.

In general, magnetic tapes for computer data storage are strongly required to have durability against repeated running as compared with video tapes and audio tapes. A backcoating layer is provided to maintain high running durability. The characteristics of the invention reside in that the backcoating layer contains 0.3 to 5% by weight of a fatty acid and/or a fatty acid ester and has projections of 100 nm or smaller in height as measured with an AFM with the density of projections of 25 to 100 nm (measured with an AFM) being 1000 or fewer per 90 $\mu$m side square.

The backcoating layer of the invention contains a non-magnetic powder and a binder and, in addition, a specific amount of a fatty acid and/or a fatty acid ester. The fatty acid preferably includes monobasic fatty acids having 10 to 26 carbon atoms and their salts with a metal, e.g., Li, Na, K or Cu. The fatty acid ester preferably includes one formed between these monobasic fatty acids and alcohols.

More specifically, the fatty acid and an ester thereof include monobasic fatty acids having 10 to 26 carbon atoms which may be saturated or unsaturated and straight-chain or branched; their salts with a metal (e.g., Li, Na, K or Cu); mono- to hexahydric alcohols having 4 to 22 carbon atoms which may be saturated or unsaturated and straight-chain or branched; alkoxyalcohols having 12 to 22 carbon atoms; mono-, di- or tri-fatty acid esters formed between a monobasic fatty acid having 10 to 26carbon atoms which may be saturated or unsaturated and straight-chain or branched and one of mono- to hexahydric alcohols having 2 to 12 carbon atoms which may be saturated or unsaturated and straight-chain or branched; and esters of a fatty acid and a polyalkylene oxide monoalkyl ether.

Specific examples of the fatty acids are capric acid, caprylic acid, lauric acid, myristic acid, palmitic acid, stearic acid, behenic acid, oleic acid, elaidic acid, linoleic acid, linolenic acid, and isostearic acid.

Specific examples of the fatty acid esters are butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentyl glycol didecanoate, ethylene glycol dioleate. Specific examples of the alcohols are oleyl alcohol, stearyl alcohol, and lauryl alcohol.

The content of the fatty acid and/or fatty acid ester in the backcoating layer is 0.3 to 5% by weight, preferably 0.5 to 4% by weight, still preferably 0.75 to 3.5% by weight. If the fatty acid and/or fatty acid ester content is less than 0.3%, the coating layer is liable to suffer from destruction starting from lubricant-starved parts, resulting in poor running durability. Too high contents plasticize the magnetic layer, resulting in film strength reduction.

The backcoating layer has on its surface projections of 25 to 100 nm high measured with an AFM at a specific density. Such projections of the specified height and density serve to moderately disperse the pressure imposed when, for example, a magnetic recording tape is wound. Even where there are projections exceeding 100 nm in height, absence of 25 to 100 nm high projections results in a failure to disperse the pressure. It follows that the projections on the backcoating layer are transferred onto the magnetic layer to create deep depressions on the magnetic layer.

While it is preferred that the backcoating layer surface has no higher projections than 100 nm, there may exist projections higher than 100 nm to an extent that does not impair the effects of the invention.

The number of 25 to 100 nm high projections per 90 $\mu$m side square as measured under an AFM is 1000 or fewer, preferably 500 or fewer. Too high a projection density results in more depressions than necessary on the magnetic layer particular near the reel around which a tape medium is wound, which will cause dropouts.

The backcoating layer comprises a non-magnetic powder and a binder. The non-magnetic powder which can be used in the backcoating layer includes inorganic powders hereinafter recited and substances used in a non-magnetic underlayer described infra. The binder which can be used in the backcoating layer includes those hereinafter described. The non-magnetic powder used in the backcoating layer preferably has an average particle size of 5 to 300 nm, particularly 10 to 250 nm. The contents of the non-magnetic powder and the binder in the backcoating layer usually range from 40 to 85% by weight and 10 to 40% by weight, respectively.

In addition to the non-magnetic powder, the binder, and the fatty acid and/or the ester thereof, the backcoating layer can further contain various additives commonly added to a backcoating layer. It is particularly preferred for the backcoating layer to contain an electrically conductive powder.

The conductive powder includes carbon black, metal, inorganic powder having metal or carbon adhered thereto, and semiconductors, such as $TiO_2$ and $In_2O_3$. Carbon black is particularly preferred. The conductive powder preferably has an average particle size of 10 to 150 nm.

In using carbon black, which is a preferred conductive powder, it is preferred to use two carbon black species different in average particle size, i.e., fine carbon black particles and coarse carbon black particles, in combination. In this case, the average particle sizes of the two species are selected so as to give an average within the above-recited range.

In general, addition of fine carbon black particles results in low surface resistivity and low light transmission of the backcoating layer. In view of the fact that many magnetic recording systems utilize a transmission of a magnetic tape as an operational signal, addition of fine carbon black particles is specially effective to this kind of systems. Besides, fine carbon black particles are generally excellent in liquid lubricant holding capability and therefore contributory to reduction of frictional coefficient in cooperation with the lubricant. The coarse carbon black particles, on the other hand, function as a solid lubricant. Further, they form micro projections on the backcoating layer surface to reduce the contact area, which contributes to reduction of frictional coefficient. However, since coarse carbon black particles easily fall off the backcoating layer in tape sliding in a severe running system, use of the coarse particles alone tends to result in an increase of error ratio.

Commercially available fine carbon black particles that can be utilized in the invention include RAVEN 200B (average particle size (hereinafter the same): 18 nm) and RAVEN 1500B (17 nm), both available from Columbian Carbon; BP800 (17 nm) from Cabot Corp.); PRINNTEX 90 (14 nm), PRINTEX 95 (15 nm), PRINTEX 85 (16 nm), and PRINTEX 75 (17 nm), all from Degussa AG; and #3950 (16 nm) from Mitsubishi Chemical Corp.

Commercially available coarse carbon black particles include Thermal Black (270 nm) from Cancarb, Ltd.; and RAVEN MTP (275 nm) from Columbian Carbon.

Where two kinds of carbon black having different average particle sizes are used in the backcoating layer, the weight ratio of fine particles (10 to 20 nm) to coarse particles (230 to 300 nm) is preferably 99:1 to 60:40, still preferably 90:10 to 70:30.

The total content of the conductive powder in the backcoating layer usually ranges from 50 to 200 parts by weight, preferably 80 to 150 parts by weight, per 100 parts by weight of the binder.

The backcoating layer can contain inorganic powder as non-magnetic powder. It is preferred to use a inorganic powder having a Mohs hardness of 5 to 9.

Addition of the hard inorganic powder having a Mohs hardness of 5 to 9, is effective in enhancing the strength of the backcoating layer and thereby improving the running durability of the recording medium. A combined use of the hard inorganic powder with carbon black and the soft inorganic powder provides a strong backcoating layer less susceptible to deterioration by repeated sliding. Further, existence of the hard inorganic powder in the backcoating layer produces moderate abrasive properties to reduce adhesion of grinding debris to tape guide poles, etc. When, in particular, used in combination with the soft one, the hard inorganic powder improves sliding properties on guide poles with a rough surface and thereby stabilizes the frictional coefficient of the backcoating layer.

The hard inorganic powder preferably has an average particle size of 80 to 250 nm, particularly 100 to 210 nm.

The hard inorganic powder with a Mohs hardness of 5 to 9 includes $\alpha$-iron oxide, $\alpha$-alumina, and chromium oxide ($Cr_2O_3$). These powders may have a surface coated with carbon or the like. These powders can be used either individually or as a combination. Preferred of them is $\alpha$-iron oxide or α-alumina. The content of the hard inorganic powder is usually 300to550 parts by weight, preferably 400 to 500 parts by weight, per 100 parts by weight of the conductive powder.

It is desirable for the backcoating layer to contain inorganic powders having Mohs hardness of 5 to 9 and the two kinds of carbon black different in average particle size.

The backcoating layer may contain lubricants other than the above-described fatty acid and/or fatty acid ester. The other lubricants are selected from those described later as an additive to the non-magnetic or magnetic layers hereinafter described. Those lubricants (the fatty acid and/or fatty acid ester, and the other lubricants) can be added usually in an amount of 3 to 15 parts by weight per 100 parts by weight of the binder.

The thickness of the backcoating layer is preferably, but not limited to, 0.1 to 1.0 μm.

The magnetic recording medium of the invention has a magnetic layer provided on a support either directly or via a non-magnetic layer. The magnetic layer comprises a ferromagnetic powder and a binder. It may further comprise other various additives described later.

The thickness of the magnetic layer is usually, but not limited to, 0.01 to 0.5 μm, preferably 0.05 to 0.2 μm.

The magnetic layer preferably has a coercive force Hc of 120 to 360 kA/m (1500 to 4520 Oe), particularly 158 to 350 kA/m. The component which changes the direction of magnetization in an applied magnetic field of 80 kA/m or lower is preferably less than 1%, still preferably 0.7% or less, particularly preferably 0.5% or less, in the magnetization distribution.

The magnetic layer usually has an in-plane squareness SQ of 0.5 to 0.95, preferably 0.6 to 0.85, and a perpendicular squareness SQ of 0.5 or smaller, preferably 0.4 or smaller, still preferably 0.35or smaller. The lower limit of the perpendicular squareness is theoretically 0 but practically 0.1 or greater.

The ferromagnetic powder used in the magnetic layer preferably includes, but is not limited to, needle-like ferromagnetic alloy particles mainly comprising Fe and hexagonal ferrite particles. The ferromagnetic alloy powder comprises Fe as a main component and Co, Ni, Mn, Zn, Nd, etc. as an alloying component. In particular, an Fe—Co alloy is known to have a high coercive force Hc.

The particle size of the ferromagnetic alloy powder is not particularly limited but is specified as follows in relation to the gap length (hereinafter, gl) of a recording head. A preferred average major axis length (i.e., average length) of the particles is 1/10 to 1/2, particularly 1/8 to 1/3, of the gl, and a preferred average minor axis length (i.e., average width) is 1/100 to 1/5, particularly 1/50 to 1/8, of the gl. Too small particles can result in unstable magnetization due to thermal fluctuation. Too large particles can result in reduction of S/N ratio.

The ferromagnetic alloy powder has a saturation magnetization as usually of 80 to 140 A·m²/kg, preferably 90 to 130 A·m²/kg, and a coercive force Hc usually of 120 to 360 kA/m, preferably 158 to 350 kA/m.

The hexagonal ferrite powder includes barium ferrite, strontium ferrite, lead ferrite, and cobalt ferrite. Specific examples are barium ferrite and strontium ferrite of magnetoplumbite type; magnetoplumbite type ferrites coated with spinel type ferrite; and barium ferrite and strontium ferrite of magnetoplumbite type containing a spinel phase in parts. These ferrites may contain additional elements, such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, and Nb. Usually, ferrites doped with Co—Zn, Co—Ti, Co—Ti—Zr, Co—Ti—Zn, Ni—Ti—Zn, Nb—Zn—Co, Sb—Zn—Co, Nb—Zn, etc. can be used. Depending on the raw materials or the processes adopted, some ferrites can contain intrinsic impurity.

The hexagonal ferrite powder preferably has an average diameter of 1/10 to 1/2, particularly 1/8 to 1/3, of the gl, and an average thickness of 1/100 to 1/5, particularly 1/50 to 1/8, of the gl. Too small particle sizes can result in unstable magnetization due to thermal fluctuation. Too large particle sizes tend to result in reduction of S/N ratio. Where an MR head is used to increase the track density, a low noise should be achieved. In this connection, the average diameter is preferably 35 nm or smaller, but smaller diameters than 10 nm fail to obtain stable magnetization because of thermal fluctuation. Diameters exceeding 40 nm result in high noise and are not fit for high-density magnetic recording as aimed in the invention. The average thickness should be smaller than the MR head element thickness and is preferably 80% or less, still preferably 60% or less, of the MR head element thickness. The thinner, the preferred, but a practically achievable lower limit is 3 nm.

The average aspect ratio (diameter to thickness ratio) of the hexagonal particles is desirably 1 to 15, more desirably 1 to 7. An average aspect ratio smaller than 1 is advantageous for packing in the magnetic layer but fails to assure sufficient orientation. An average aspect ratio greater than 15 results in increased noise due to particles' stacking. The particles within the above-recited size range have a BET specific surface area ($S_{BET}$) of 10 to 100 m²/g. The specific surface area approximately corresponds to a surface area arithmetically calculated from the diameter and the thickness.

It is usually preferred that the particle size (diameter and thickness) distribution be as small as possible. While the size distribution is mostly not normal, the coefficient of variation represented by standard deviation a to the mean (σ/mean) is 0.1 to 2.0. In order to make the particle size distribution sharper, the reaction system for particle formation is made homogenous as much as possible, or the particles produced are subjected to treatment for distribution improvement. For example, selective dissolution of ultrafine particles in an acid solution is among known treatments. The average particle volume of the hexagonal ferrite powder is usually 1000 to 10,000 nm³, preferably 1500 to 8000 nm³, still preferably 2000 to 8000 nm³.

The particle size of the ferromagnetic powder can be determined from a high resolution transmission electron micrograph. The particle size is represented by (1) length of a major axis where a particle is needle-shaped, spindle-shaped or columnar (with the height greater than the maximum diameter of the base), (2) a maximum diameter of a main plane or a base where a particle is tabular or columnar (with the height smaller than the maximum diameter of the base), or (3) a circle equivalent diameter where a particle is spherical, polygonal or amorphous and has no specific major axis. The "circle equivalent diameter" is calculated from a projected area.

The average particle size of the ferromagnetic powder is an arithmetic mean calculated from the particle sizes of about 350 primary particles measured as described supra. The term "primary particles" denotes particles dependent of each other without agglomeration or individual particles gathered into an agglomerate.

The average aspect ratio of the ferromagnetic powder is an arithmetic mean of major axis length/minor axis length ratios of particles measured as described supra. The term "minor axis length" as used herein means the diameter of a particle defined in (1) above or the thickness or height of a particle defined in (2) above. Particles defined in (3) above, having no distinction between major and minor axes, are regarded to have an aspect ratio of 1 for the sake of convenience. The term "average particle size" as used herein refers to the "average major axis length" of a particle having the shape identified in (1) above; the "average diameter" of a particle having the shape identified in (2); or the "average circle equivalent diameter" of a particle having the shape identified in (3). In connection to particle size distribution, the "coefficient of variation" is defined to be a percentage of the standard deviation to the mean.

Usually, hexagonal ferrite powders can be designed to have a coercive force Hc of from about 40 to 400 kA/m. While a higher coercive force is more advantageous for high-density recording, an upper limit is governed by the ability of the recording head. The coercive force of the magnetic powder used in the invention is about 120 to 360 kA/m, preferably 158 to 350 kA/m. Where the head has a saturation magnetization exceeding 1.4 T, the coercive force of the magnetic powder is preferably 175 kA/m or higher. The coercive force of the magnetic powder can be controlled by particle size, kind and amount of constituent elements, substitution site of elements, conditions of particle forming reaction, and the like.

The magnetic powder usually has a saturation magnetization σs of 40 to 80 A·m²/kg. A saturation magnetization tends to decrease as the particle size becomes smaller. It is well known that the saturation magnetization can be improved by using a magnetoplumbite type ferrite combined with a spinel type ferrite or by properly selecting the kinds and amounts of constituent elements. It is also possible to use a W-type hexagonal ferrite powder. It is also practiced to treat a magnetic powder to be dispersed with a substance compatible with a dispersing medium and a polymer. The treating substance includes organic or inorganic compounds. Typical examples are oxides or hydroxides of Si, Al or P, various silane coupling agents, and various titan coupling agents. The treating substance is usually used in an amount of 0.1 to 10% by weight based on the magnetic powder.

The pH of the magnetic powder is of importance for dispersibility. The pH value optimum for a dispersing medium or a polymer binder can range from about 4 to 12. From the standpoint of chemical stability and storage stability of the magnetic recording medium, a pH of about 6 to 11 is selected. The water content of the magnetic powder is also influential on dispersibility. While varying according to the kinds of the dispersing medium and the polymer binder, the optimum water content usually ranges from 0.01 to 2.0% by weight.

The hexagonal ferrite powder to be used in the invention is not limited by the process of preparation. Applicable processes of preparation include a process by controlled crystallization of glass which comprises blending barium oxide, iron oxide, an oxide of a metal that is to substitute iron, and a glass forming oxide (e.g., boron oxide) in a ratio providing a desired ferrite composition, melting the blend, rapidly cooling the melt into an amorphous solid, re-heating the solid, washing and grinding the solid to obtain a barium ferrite crystal powder; a hydrothermal process which comprises neutralizing a solution of barium ferrite-forming metal salts with an alkali, removing by-products, heating in a liquid phase at 100° C. or higher, washing, drying, and grinding to obtain a barium ferrite crystal powder; and a coprecipitation process which comprises neutralizing a solution of barium ferrite-forming metal salts with an alkali, removing by-products, drying, treating at 1100° C. or lower, and grinding to obtain a barium ferrite crystal powder.

The magnetic layer may be provided directly on a non-magnetic support, but it is preferred that a non-magnetic layer (hereinafter sometimes referred to as an underlayer) be provided between the support and the magnetic layer. The non-magnetic underlayer will be described further.

The underlayer which can be provided in the invention is not particularly limited in composition as long as it is substantially non-magnetic. It usually comprises at least a resin and preferably contains powder, either organic or inorganic, as dispersed in the resin. While the inorganic powder is preferably, and usually, selected from non-magnetic powders, the underlayer may contain magnetic powder as long as the underlayer is substantially non-magnetic.

The inorganic non-magnetic powder includes metal oxides, metal carbonates, metal sulfates, metal nitrides, metal carbides, and metal sulfides. Examples are α-alumina having an α-phase content of 90% or more, β-alumina, δ-alumina, θ-alumina, silicon carbide, chromium oxide, cerium oxide, α-iron oxide, hematite, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide. They can be used either individually or in combination. Preferred among them are titanium dioxide, zinc oxide, iron oxide, and barium sulfate, particularly titanium dioxide and α-iron oxide, because they can be produced with small particle size distribution and be endowed with a function through many means.

The non-magnetic powder preferably has a particle size of 0.005 to 2 μm. If desired, non-magnetic powders different in particle size may be used in combination, or a single kind of a non-magnetic powder having a broadened size distribution may be used to produce the same effect. A still preferred particle size of the non-magnetic powder is 0.01 to 0.2 μm. In particular, a particulate metal oxide preferably has an average particle size of 0.08 μm or smaller, and a needle-like metal oxide preferably has a major axis length of 0.3 μm or shorter, especially, 0.2 μm or shorter. The tap density of the powder is 0.05 to 2 g/ml, preferably 0.2 to 1.5 g/ml. The water content of the non-magnetic powder is 0.1 to 5% by weight, preferably 0.2 to 3% by weight, still preferably 0.3 to 1.5% by weight. The non-magnetic powder has a pH of 2 to 11, preferably between 5.5 and 10, still preferably 3 to 6, and a specific surface area of 1 to 100 m²/g, preferably 5 to 80 m²/g, still preferably 10 to 70 m²/g. The non-magnetic powder preferably has a crystallite size of 0.004 to 1 μm, particularly 0.04 to 0. 1 μm. The DBP (dibutylphthalate) oil absorption is 5 to 100 ml/100 g, preferably 10 to 80 ml/100 g, still preferably 20 to 60 ml/100 g. The specific gravity is to 12, preferably 3 to 6. The particle shape maybe any of needle-like, spherical, polygonal and tabular shapes. The Mohs hardness is preferably 4 to 10. The SA (stearic acid) adsorption of the non-magnetic powder is in a range of 1 to 20 μmol/m², preferably 2 to 15 μmol/m², still preferably 3 to 8 μmol/m².

It is preferred that $Al_2O_3$, $SiO_2$, $TiO_2$, $ZrO_2$, $SnO_2$, $Sb_2O_3$, ZnO or $Y_2O_3$ be present on the surface of the non-magnetic powder by surface treatment. Among them, preferred for dispersibility are $Al_2O_3$, $SiO_2$, $TiO_2$, and $ZrO_2$, with $Al_2O_3$, $SiO_2$, and $ZrO_2$ being still preferred. These oxides may be used either individually or in combination. According to the purpose, a composite surface layer can be formed by co-precipitation or a method comprising first applying alumina to the non-magnetic particles and then treating with silica or vise versa. The surface layer may be porous for some purposes, but a homogeneous and dense surface layer is usually preferred.

Specific examples of commercially available non-magnetic powders which can be used in the underlayer include Nanotite (from Showa Denko K. K.); HIT-100 and ZA-G1 (both from Sumitomo Chemical Co., Ltd.); α-hematite series DPN-250, DPN-250BX, DPN-245, DPN-270BX, DPN-500BX, DBN-SA1, and DBN-SA3 (from Toda Kogyo Corp.); titanium oxide series TTO-51B, TTO-55A, TTO-55B, TTO-55C, TTO-55S, and TTO-55D, SN-100, and α-hematite series E270, E271, E300, and E303 (from Ishihara Sangyo Kaisha, Ltd.); titanium oxide series STT-4D, ST-30D, STT-30, and STT-65C, and α-hematite α-40(from Titan Kogyo K. K.); MT-100S, MT-100T, MT-150W, MT-500B, MT-600B, MT-100F, and MT-500HD (from Tayca Corp.); FINEX-25, BF-1, BF-10, BF-20, and ST-M (from Sakai Chemical Industry Co., Ltd.); DEFIC-Y and DEFIC-R (from Dowa Mining Co., Ltd.); AS2BM and TiO2P25 (from Nippon Aerosil Co., Ltd.); and 100A and 500A (from Ube Industries, Ltd.) and calcined products thereof. Preferred of them are titanium dioxide and α-iron oxide.

Carbon black can be incorporated into the non-magnetic underlayer to produce known effects, i.e., reduction of surface resistivity Rs and reduction of light transmission, and also to obtain a desired micro Vickers hardness. Addition of carbon black is also effective in holding the lubricant. Useful carbon black species include furnace black for rubber, thermal black for rubber, carbon black for colors, and acetylene black. The characteristics of carbon black to be used, such as those described below, should be optimized according to an intended effect. Combined use of different kinds of carbon black can bring about enhancement of the effect.

The carbon black in the underlayer has a specific surface area of 100 to 500 $m^2/g$, preferably 150 to 400 $m^2/g$, a DBP oil absorption of 20 to 400 ml/100 g, preferably 30 to 400 ml/100 g, a particle size of 5 to 80 nm, preferably 10 to 50 nm, still preferably 10 to 40 nm. The carbon black preferably has a pH of 2 to 10, a water content of 0.1 to 10% by weight, and a tap density of 0.1 to 1 g/ml.

Specific examples of commercially available carbon black which can be used in the underlayer include Black Pearls 2000, 1300, 1000, 900, 800, 880, and 700, and Vulcan XC-72 (from Cabot Corp.); #3050B, #3150B, #3250B, #3750B, #3950B, #950, #650B, #970B, #850B, MA-600, M-230, #4000, and #4010 (from Mitsubishi Chemical Corp.); Conductex SC, RAVEN 8800, 8000, 7000, 5750, 5250, 3500, 2100, 2000, 1800, 1500, 1255, 1250 (from Columbian Carbon); and Ketjen Black EC (from Akzo Nobel Chemicals). Carbon black having been surface treated with a dispersant, etc., resin-grafted carbon black, or carbon black with its surface partially graphitized may be used. Carbon black may previously been dispersed in a binder before being added to a coating composition. The carbon black is used in an amount of 50% by weight or less based on the above-described inorganic powder and 40% by weight or less based on the total weight of the non-magnetic underlayer. The above-recited carbon black species can be used either individually or as a combination thereof. In selecting carbon black species for use in the present invention, reference can be made, e.g., in Carbon Black Kyokai (ed.), Carbon Black Binran.

The underlayer can contain organic powder according to the purpose. Useful organic powders include acrylic-styrene resin powders, benzoquanamine resin powders, melamine resin powders, and phthalocyanine pigments. Polyolefin resin powders, polyester resin powders, polyamide resin powders, polyimide resin powders, and polyethylene fluoride resin powders are also usable. Methods of preparing these resin powders include those disclosed in JP-A-62-18564 and JP-A-60-255827.

With respect to the other techniques involved in forming the underlayer, e.g., binder resins, lubricants, dispersants, additives, solvents, and methods of dispersion, the following description as for the magnetic layer applies. In particular, known techniques regarding a magnetic layer can be applied with respect to the kinds and amounts of binder resins, additives and dispersants.

Binders which can be used in the magnetic layer, the optional non-magnetic layer, and the backcoating layer include conventionally known thermoplastic resins, thermosetting resins and reactive resins, and mixtures thereof. The thermoplastic resins used as a binder usually have a glass transition temperature of −100 to 150° C., an number average molecular weight of 1,000 to 200,000, preferably 10,000 to 100,000, and a degree of polymerization of about 50 to 1000.

Such thermoplastic resins include homo- or copolymers containing a unit derived from vinyl chloride, vinyl acetate, vinyl alcohol, maleic acid, acrylic acid, an acrylic ester, vinylidene chloride, acrylonitrile, methacrylic acid, a methacrylic ester, styrene, butadiene, ethylene, vinyl butyral, vinyl acetal, a vinyl ether, etc.; polyurethane resins, and various rubber resins. Useful thermosetting or reactive resins include phenolic resins, epoxy resins, thermosetting polyurethane resins, urea resins, melamine resins, alkyd resins, reactive acrylic resins, formaldehyde resins, silicone resins, epoxy-polyamide resins, polyester resin/isocyanate prepolymer mixtures, polyester polyol/polyisocyanate mixtures, and polyurethane/polyisocyanate mixtures. For the details of these resins, Plastic Handbook, Asakura Shoten (publisher) can be referred to. Known electron beam (EB)-curing resins can also be used in each layer. The details of the EB-curing resins and methods of producing them are described in JP-A-62-256219. The above-recited resins can be used either individually or as a combination thereof. Preferred resins are a combination of a polyurethane resin and at least one vinyl chloride resin selected from polyvinyl chloride, a vinyl chloride-vinyl acetate copolymer, a. vinyl chloride-vinyl acetate-vinyl alcohol copolymer, and a vinyl chloride-vinyl acetate-maleic anhydride copolymer and a combination of the above-described combination and polyisocyanate.

The polyurethane resin includes those of known structures, such as polyester polyurethane, polyether polyurethane, polyether polyester polyurethane, polycarbonate polyurethane, polyester polycarbonate polyurethane, and polycaprolactone polyurethane.

In order to ensure dispersing capabilities and durability, it is preferred to introduce into each of the above-recited binder resins at least one polar group by copolymerization or through addition reaction, the polar group being selected from —COOM, —$SO_3M$, —$OSO_3M$, —P=O(OM)$_2$, —O—P=O(OM)$_2$ (wherein M is a hydrogen atom or an alkali metal base), OH, $NR_2$, $N^+R_3$ (wherein R is a hydrocarbon group), an epoxy group, SH, CN, and the like. The amount of the polar group to be introduced is $10^{-1}$ to $10^{-8}$ mol/g, preferably $10^{-2}$ to $10^{-6}$ mol/g.

Examples of commercially available binder resins which can be used in the invention are VAGH, VYHH, VMCH, VAGF, VAGD, VROH, VYES, VYNC, VMCC, XYHL, XYSG, PKHH, PKHJ, PKHC, and PKFE (from Union Carbide Corp.); MPR-TA, MPR-TA5, MPR-TAL, MPR-TSN, MPR-TMF, MPR-TS, MPR-TM, and MPR-TAO (from Nisshin Chemical Industry Co., Ltd.); 1000w, DX80, DX81, DX82, DX83, and 100FD (from Denki Kagaku Kogyo K. K.); MR-104, MR-105, MR110, MR100, MR555, and 400X-110A (from Zeon Corp.); Nipporan N2301, N2302, and N2304 (from Nippon Polyurethane Industry Co., Ltd.); Pandex T-5105, T-R3080, and T-5201, Barnock D-400 and D-210-80, and Crisvon 6109 and 7209 (from Dainippon Ink & Chemicals, Inc.); Vylon UR8200, UR8300, UR-8700, RV530, and RV280 (from Toyobo Co., Ltd.); Daiferamin 4020, 5020, 5100, 5300, 9020, 9022, and 7020 (from Dainichiseika Color & Chemicals Mfg. Co., Ltd.); MX5004 (from Mitsubishi Chemical Corp.); Sanprene SP-150 (from Sanyo Chemical Industries, Ltd.); and Saran F310 and F210 (from Asahi Chemical Industry Co., Ltd.).

The binder is used in the non-magnetic layer and the magnetic layer in an amount of 5 to 50% by weight, preferably 10 to 30% by weight, based on the non-magnetic powder and the ferromagnetic powder, respectively. Where a vinyl chloride resin, a polyurethane resin, and polyisocyanate are used in combination, their amounts are selected from a range of 5 to 30% by weight, a range of 2 to 20% by weight, and a range of 2 to 20% by weight, respectively. In case where head corrosion by a trace amount of released chlorine is expected to occur, polyurethane alone or a combination of polyurethane and polyisocyanate can be used. The polyurethane to be used preferably has a glass transition temperature of −50 to 150° C., preferably 0 to 100° C., an elongation at break of 10 to 2000%, a stress at rupture of 0.05 to 10 kg/mm$^2$ (0.49 to 98 Mpa), and a yield point of 0.05 to 10 kg/mm$^2$ (0.49 to 98 Mpa).

The non-magnetic layer and the magnetic layer can have different binder compositions in terms of the binder content, the proportions of a vinyl chloride resin, a polyurethane resin, polyisocyanate, and other resins, the molecular weight of each resin, the amount of the polar group introduced, and other physical properties of the resins. It is rather desirable to optimize the binder design for each layer. For the optimization, known techniques relating to a non-magnetic/magnetic multilayer structure can be utilized. For example, to increase the binder content of the magnetic layer is effective to reduce scratches on the magnetic layer, or to increase the binder content of the non-magnetic layer is effective to increase flexibility thereby to smooth head touch.

The polyisocyanate which can be used in the invention includes tolylene diisocyanate, 4,4'-diphenylmethane diisocyanate, hexamethylene diisocyanate, xylylene diisocyanate, naphthyelene-1,5-diisocyanate, o-toluidine diisocyanate, isophorone diisocyanate, and triphenylmethane triisocyanate. Further included are reaction products between these isocyanate compounds and polyols and polyisocyanates produced by condensation of the isocyanates. Examples of commercially available polyisocyanates which can be used in the invention are Coronate L, Coronate HL, Coronate 2030, Coronate 2031, MillionateMR, and MillionateMTL (from Nippon Polyurethane Industry Co., Ltd.); Takenate D-102, Takenate D-110N, Takenate D-200, and Takenate D-202 (from Takeda Chemical Industries, Ltd.); and Desmodur L, Desmodur IL, Desmodur N, and Desmodur HL (from Sumitomo Bayer Urethane Co., Ltd.). They can be used in each layer, either alone or as a combination of two or more thereof taking advantage of difference in curing reactivity.

The carbon black which can be used in the magnetic layer includes furnace black for rubber, thermal black for rubber, carbon black for colors, and acetylene black. The carbon black preferably has a specific surface area of 5 to 500 m$^2$/g, a DBP oil absorption of 10 to 400 ml/100 g, a particle size of 5 to 300 nm, particularly 10 to 250 nm, especially 20 to 200 nm, a pH of 2 to 10, a water content of 0.1 to 10% by weight, and a tap density of 0.1 to 1 g/ml.

Specific examples of commercially available carbon black which can be used in the magnetic layer include Black Pearls 2000, 1300, 1000, 905, 800, and 700, and Vulcan XC-72 (from Cabot Corp.); #80, #60, #55, #50, and #35 (from Asahi Carbon Co., Ltd.); #2400B, #2300, #900, #1000, #30, #40, and #10B (from Mitsubishi Chemical Corp.); Conductex SC, RAVEN 150, 50, 40, and 15, and RAVEN-MT-P (from Columbian Carbon); and Ketjen Black EC (from Nippon EC). Carbon black having been surface treated with a dispersant, etc., resin-grafted carbon black, or carbon black with its surface partially graphitized may be used. Carbon black may previously been dispersed in a binder before being added to a magnetic coating composition. The above-recited carbon black species can be used either individually or as a combination thereof. The carbon black, if added, is preferably used in an amount of 0.1 to 30% by weight based on the magnetic powder. Carbon black serves for antistatic control, reduction of frictional coefficient, reduction of light transmission, film strength enhancement, and the like. These functions vary depending on the species. Accordingly, it is possible, or rather desirable, to optimize the kinds, amounts, and combinations of the carbon black species for each layer according to the intended purpose with reference to the above-mentioned characteristics, such as particle size, oil absorption, conductivity, pH, and so forth. In selecting carbon black species for use in the magnetic layer, reference can be made, e.g., in Carbon Black Kyokai (ed.), Carbon Black Binran.

Known abrasives mostly having a Mohs hardness of 6 or higher can be used in the present invention. Such abrasives include α-alumina having an α-phase content of 90% or more, β-alumina, chromium oxide, cerium oxide, α-iron oxide, corundum, artificial diamond, silicon nitride, silicon carbide, titanium carbide, titanium oxide, silicon dioxide, and boron nitride. These abrasives can be used either individually or as a mixture thereof or as a composite thereof (an abrasive surface treated with another). Existence of impurity compounds or elements, which are sometimes observed in the abrasives, will not affect the effect as long as the content of the main component is 90% by weight or higher. The abrasives preferably have a particle size of 0.01 to 2 μm, particularly 0.05 to 1.0 μm, especially 0.05 to 0.5 μm. In order to improve electromagnetic characteristics, in particular, it is desirable for the abrasives to have a narrow size distribution. In order to improve durability, abrasives different in particle size may be used in combination, or a single kind of an abrasive having a broadened size distribution may be used to produce the same effect. The abrasives preferably have a tap density of 0.3 to 2 g/ml, a water content of 0.1 to 5% by weight, a pH of 2 to 11, and a specific surface area of 1 to 30 m$^2$/g. The abrasive grains may be needle-like, spherical or cubic. Angular grains are preferred for high abrasive performance.

Examples of commercially available abrasives which can be used in the invention are AKP-12, AKP-15, AKP-20, AKP-30, AKP-50, HIT-20, HIT-30, HIT-55, HIT-60, IHT-70, HIT-80, and HIT-100 (from Sumitomo Chemical Co., Ltd.); ERC-DBM, HP-DBM, and HPS-DBM (from Reynolds Metals Co.); WA10000 (from Fujimi Kenmazai K. K.); UB 20 (from Uyemura & CO., LTD); G-5, Chromex U2, and Chromex U1 (from Nippon Chemical Industrial Co., Ltd.); TF100 and TF140 (from Toda Kogyo Corp.); Beta-Random Ultrafine (from Ibiden Co., Ltd.); and B-3 (from Showa Mining Co., Ltd.).

If necessary, the abrasive can be incorporated into the non-magnetic layer thereby to control the surface profile of the coating layer or the projecting conditions of the abrasive grains on the coating layer. It is a matter of course that the particle size and the amount of the abrasive added to the magnetic layer and the non-magnetic layer should be optimized.

The magnetic layer, the optional non-magnetic layer, and the backcoating layer can contain other additives capable of producing lubricating effects, antistatic effects, dispersing effects, plasticizing effects, and the like. Such additives include molybdenum disulfide, tungsten graphite disulfide, boron nitride, graphite fluoride, silicone oils, polar group-containing silicones, fatty acid-modified silicones, fluorine-containing silicones, fluorine-containing alcohols, fluorine-containing esters, polyolefins, polyglycols, alkylphosphoric esters and their alkali metal salts, alkylsulfuric esters and their alkali metal salts, polyphenyl ethers, phenylphosphonic acid, α-naphtylphosphoric acid, phenylphosphoric acid, diphenylphosphoric acid, p-ethylbenzenephosphonic acid, phenylphosphinic acid, aminoquinones, various silane coupling agents, titan coupling agents, fluorine-containing alkylsulfuric ester and their alkali metal salts, monobasic fatty acids having 10 to 24 carbon atoms, which may be saturated or unsaturated and straight-chain or branched, and their metal (e.g.,Li, Na, K, Cu) salts, saturated or unsaturated, and straight-chain or branched alcohols having 12 to 22 carbon atoms, alkoxyalcohols having 12 to 22 carbon atoms, mono-, di- or tri-fatty acid esters between monobasic fatty acids having 10 to 24 carbon atoms, which may be saturated or unsaturated and straight-chain or branched, and at least one of mono- to hexahydric, saturated or unsaturated, and straight-chain or branched alcohols having 2 to 12 carbon atoms, fatty acid esters of polyalkylene oxide monoalkyl ethers, fatty acid amides having 8 to 22 carbon atoms, and aliphatic amines having 8 to 22 carbon atoms.

Examples of the fatty acids are capric acid, caprylic acid, lauric acid, myristic acid, palmitic acid, stearic acid, behenic acid, oleic acid, elaidic acid, linoleic acid, linolenic acid, and isostearic acid. Examples of the esters are butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentyl glycol didecanoate, and ethylene glycol dioleate. Examples of the alcohols are oleyl alcohol, stearyl alcohol, and lauryl alcohol.

As previously described, it is essential for the backcoating layer to contain a specific fatty acid and/or an ester thereof.

The magnetic layer, the optional non-magnetic underlayer, and the backcoating layer can contain surface active agents. Useful surface active agents include nonionic ones, such as alkylene oxide types, glycerol types, glycidol types, and alkylphenol ethylene oxide adducts; cationic ones, such as cyclic, amines, ester amides, quaternary ammonium salts, hydantoin derivatives, heterocyclic compounds, phosphonium salts, and sulfonium salts; anionic ones containing an acidic group, such as a carboxyl group, a sulfonic acid group, a phosphoric acid group, a sulfuric ester group or a phoshoric ester group; and amphoteric ones, such as amino acids, amino sulfonic acids, amino alcohol sulfuric or phosphoric esters, and alkyl betaines. For the details of the surface active agents, refer to Kaimen Kasseizai Binran published by Sangyo Tosho K. K.

The above-recited lubricants, antistatic agents, and like additives do not always need to be 100% pure and may contain impurities, such as isomers, unreacted materials, by-products, decomposition products, and oxides. The proportion of the impurities is preferably 30% by weight at the most, still preferably 10% by weight or less.

Since the physical actions of these additives vary among individuals, the kind and amount of an additive or the mixing ratio of additives used in combination for producing a synergistic effect should be determined so as to produce optimum results according to the purpose. The following is a few examples of conceivable manipulations using additives. (1) Bleeding of fatty acid additives is suppressed by using fatty acids having different melting points between the magnetic layer and the non-magnetic layer. (2) Bleeding of ester additives is suppressed by using esters different in boiling point, melting point or polarity between the magnetic layer and the non-magnetic layer. (3) Coating stability is improved by adjusting the amount of a surface active agent. (4) The amount of the lubricant in the non-magnetic layer is increased to improve the lubricating effect. The total amount of the lubricants to be used in the magnetic or non-magnetic layer is generally selected from a range of 0.1 to 50% by weight, preferably 2 to 25% by weight, based on the magnetic or non-magnetic powder.

All or part of the additives can be added at any stage of preparing the magnetic or non-magnetic coating composition. For example, the additives can be blended with the magnetic powder before kneading, be mixed with the magnetic powder, the binder, and a solvent in the step of kneading, or be added during or after the step of dispersing or immediately before coating. The purpose of using an additive could be achieved by applying a part of, or the whole of, the additive on the magnetic layer surface either by simultaneous coating or successive coating, which depends on the purpose. A lubricant could be applied to the magnetic layer surface even after calendering or slitting, which depends on the purpose. Known organic solvents, e.g., those described in JP-A-6-68453, can be used in the invention.

The thickness of the support is selected from a range of 2 to 100 μm, preferably 2 to 80 μm. In particular, the thickness of the support for computer tapes ranges 3.0 to 15 μm, preferably 3.0 to 12 μm, still preferably 4.0 to 9 μm.

An undercoating layer for adhesion improvement may be provided between the support and the non-magnetic layer or the magnetic layer. The undercoating layer usually has a thickness of 0.01 to 0.5 μm, preferably 0.02 to 0.5 μm.

The thickness of the non-magnetic layer, if provided, is 0.02 to 5.0 μm, preferably 0.03 to 3.0 μm, still preferably 0.05 to 2.5 μm. The underlayer manifests its effects as long as it is substantially non-magnetic. The effects of the underlayer will be produced even where it contains a small amount of a magnetic substance, either intentionally or unintentionally. Such a layer structure is construed as being included under the scope of the present invention. The term "substantially non-magnetic" as referred to above means that the underlayer has a residual magnetic flux density of 0.01 T or less or a coercive force of 7.96 kA/m or less (100 Oe or less). Preferably, the underlayer has neither residual magnetic flux density nor coercive force.

The support which can be used in the invention is not particularly limited. It is preferred that the support be substantially non-magnetic and flexible.

Known films, such as polyesters (e.g., polyethylene terephthalate and polyethylene naphthalate), polyolefins, cellulose triacetate, polycarbonate, polyamides (including aliphatic polyamides and aromatic polyamides, e.g., Aramid), polyimide, polyamideimide, polysulfone, and polybenzoxazole, can be used. High strength supports of polyethylene naphthalate or polyamide are preferred. If desired, a laminated support, such as the one disclosed in JP-A-3-224127, can be used to provide different surface profiles between the magnetic layer side and the back side. The support may be subjected to surface treatment, such as corona discharge treatment, plasma treatment, treatment for easy adhesion, heat treatment, and dustproof treatment. An alumina or glass support could also be employed.

In order to accomplish the object of the invention, it is desirable to use a support having an average roughness (mean surface average; Ra) of 8.0 nm or smaller, preferably 4.0 nm or smaller, still preferably 2.0 nm or smaller, as measured with a three-dimensional profilometer HD2000, supplied by Wyko. It is preferred for the support to have not only a small mean surface average roughness but no projections of 0.5 μm or higher. The surfzace profile is controlled arbitrarily by the size and amount of fillers added to the support where necessary. Useful fillers include oxides and carbonates of Ca, Si, Ti, etc. and organic fine powders of acrylic resins, etc. The surface profile of the support preferably has a maximum height $R_{MAX}$ of 1 μm or smaller, a 10 point average roughness $R_z$ of 0.5 μm or smaller, a maximum peak-to-mean surface height $R_p$ of 0.5 μm or smaller, a maximum mean surface-to-valley depth $R_v$ of 0.5 μm or smaller, a mean surface area ratio Sr of 10 to 90%, and an average wavelength $\lambda_a$ of 5 to 300 μm. The projection distribution on the support surface can be controlled arbitrarily by the filler to obtain desired electromagnetic characteristics and durability. The number of projections of 0.01 to 1 μm is controllable between 0 and 2000 per 0. 1 mm2. The support preferably has an F5 value of 5 to 50 kg/mm² (49 to 490 Mpa), a thermal shrinkage of 3% or less, particularly 1.5% or less, at 100° C.×30 minutes and of 1% or less, particularly 0.5% or less, at 80° C.×30 minutes, a breaking strength of 5 to 100 kg/mm² (≈49 to 980MPa), an elastic modulus of 100 to 2000 kg/mm² (≈0.98 to 19.6 GPa), a coefficient of temperature expansion of $10^{-4}$ to $10^{-8}$/°C., particularly $10^{-5}$ to $10^{-6}$/°C., and a coefficient of humidity expansion of $10^{-4}$/RH % or less, particularly $10^{-5}$/RH % or less. It is desirable for the support to be isotropic such that the differences in these thermal, dimensional, and mechanical characteristics in all in-plane directions are within 10%.

The method of preparing the magnetic and non-magnetic coating compositions includes at least the steps of kneading and dispersing and, if desired, the step of mixing which is provided before or after the step of kneading and/or the step of dispersing. Each step may be carried out in two or more divided stages. Any of the materials, including the magnetic powder, non-magnetic powder, binder, carbon black, abrasive, antistatic, lubricant, and solvent, can be added at the beginning of or during any step. Individual materials may be added in divided portions in two or more steps. For example, polyurethane may be added dividedly in the kneading step, the dispersing step, and a mixing step which is provided for adjusting the viscosity of the dispersion. To accomplish the object of the invention, known techniques for coating composition preparation can be applied as a part of the method. The kneading step is preferably performed using a kneading machine with high kneading power, such as an open kneader, a continuous kneader, a pressure kneader, and an extruder. In using a kneader, the magnetic or non-magnetic powder, part (preferably at least 30% of the total binder) or the whole of the binder, and 15 to 500 parts by weight of a solvent per 100 parts by weight of the magnetic or non-magnetic powder are kneaded. For the details of the kneading operation, reference can be made in JP-A-1-106338 and JP-A-1-79274. In the step of dispersing, glass beads can be used to disperse the magnetic or non-magnetic mixture. Zirconia beads, titania beads or steel beads, which are high-specific-gravity dispersing media, are suitable. The size and mixing ratio of the dispersing medium should be optimized. Known dispersing machines can be used.

The magnetic recording medium having a multilayer structure is preferably produced by the following coating methods.

(a) A method comprising forming a non-magnetic underlayer by using a coating apparatus generally employed for a magnetic coating composition, such as a gravure coater, a roll coater, a blade coater or an extrusion coater, and applying a magnetic coating composition while the underlayer is wet by means of an extrusion coating apparatus disclosed in JP-B-1-46186 (the term "JP-B" as used herein means an "examined Japanese patent publication") and JP-A-60-238179, which is of the type in which a support is pressed while coated.

(b) A method in which the magnetic layer and the non-magnetic underlayer are applied almost simultaneously through a single coating head disclosed in JP-A-63-88080, JP-A-2-17971, and JP-A-2-265672, the coating head having two slits through which the respective coating liquids-pass.

(c) A method in which the upper and lower layers are applied almost simultaneously by means of an extrusion coating apparatus disclosed in JP-A-2-174965, the apparatus being equipped with a back-up roll.

In order to prevent magnetic particles from agglomerating that may cause reduction of electromagnetic characteristics, it is advisable to give shear to the coating composition in the coating head. The techniques taught in JP-A-62-95174 and JP-A-1-236968 are suited for shear application. The coating compositions should satisfy the viscosity requirement specified in JP-A-3-8471. A successive coating manner in which a magnetic coating composition is applied after an underlayer is dried is also applicable without impairing the effects of the invention. However, the above-mentioned simultaneous coating systems are recommended to reduce coating defects and thereby to lower a dropout rate.

In the case of disk media, although sufficiently isotropic orientation could sometimes be obtained with no orientation with an orientation apparatus, it is preferred to use a known random orientation apparatus in which cobalt magnets are obliquely arranged in an alternate manner or an alternating magnetic field is applied with a solenoid. While, in the case of ferromagnetic metal powder, isotropic orientation is in general preferably an in-plane 2D random orientation, it may be 3D orientation with a vertical component. Hexagonal ferrite powder is liable to have 3D random orientation in in-plane directions plus the vertical direction but could have in-plane 2D random orientation. It is also possible to provide a disk with circumferentially isotropic magnetic characteristics by vertical orientation in a known manner, for example, by using facing magnets with their polarities opposite. Vertical orientation is particularly preferred for high-density recording. Circumferential orientation may be achieved by spin coating.

In the production of magnetic tapes, the magnetic powder is oriented in the running direction using cobalt magnets or a solenoid. The orientation apparatus is preferably designed to control the position of drying the coating layer by controlling the coating rate in view of the drying air temperature and amount. The coating rate is preferably 20 to 1000 m/min, and the drying air temperature is preferably 60° C. or higher. The coating layer may be pre-dried before entering the magnet zone.

After drying, the magnetic recording medium is usually subjected to calendering. Calendering is carried out with metallic rolls or rolls of heat-resistant plastics, such as epoxy resins, polyimide, polyamide and polyimide-amide. Calendering between metallic rolls is preferred in making double-sided magnetic recording media. Calendering is preferably carried out at a temperature of 50° C. or higher, still preferably 100° C. or higher, and a linear pressure of 200 kg/cm (196 kN/m) or higher, still preferably 300 kg/cm (294 kN/m) or higher.

The magnetic layer of the magnetic recording medium according to the invention has a saturated magnetic flux density of 0.2 to 0.5 T in using ferromagnetic metal powder and 0.1 to 0.3 T in using hexagonal ferrite powder. The coercive force Hc or remanence coercivity Hr is 1500 to 5000 Oe (120 to 400 kA/m), preferably 1700 to 3000 Oe (136 to 240 kA/m). The narrower the coercive force distribution, the better. SFD and SFDr are preferably 0.6 or smaller. A squareness of magnetic tapes is 0.7 or greater, preferably 0.8 or greater.

The magnetic recording medium of the invention has a frictional coefficient of 0.5 or less, preferably 0.3 or less, at temperatures of −10 to 40° C. and humidities of 0 to 95%. The surface resistivity on the magnetic surface is preferably $10^4$ to $10^{12}$ Ω/sq. The static potential is preferably −500 to +500 V. The magnetic layer preferably has an elastic modulus at 0.5% elongation of 100 to 2000 kg/mm² (0.98 to 19.6 GPa) in every in-plane direction and a breaking strength of 10 to 70 kg/mm² (98 to 686 Mpa). The magnetic recording medium preferably has an elastic modulus of 100 to 1500 kg/mm² (0.98 to 14.7 GPa) in every in-plane direction, a residual elongation of 0.5% or less, and a thermal shrinkage of 1% or less, particularly 0.5% or less, especially 0.1% or less, at temperatures of 100° C. or lower. The glass transition temperature (maximum loss elastic modulus in dynamic viscoelasticity measurement at 110 Hz) of the magnetic layer is preferably 50 to 120° C., and that of the non-magnetic underlayer is preferably 0 to 100° C. The loss elastic modulus preferably ranges $1 \times 10^9$ to $8 \times 10^{10}$ μN/cm². The loss tangent is preferably 0.2 or lower. Too high loss tangent easily leads to a tack problem. It is desirable that these thermal and mechanical characteristics be substantially equal in all in-plane directions with differences falling within 10%. The residual solvent content in the magnetic layer is preferably 100 mg/m² or less, still preferably 10 mg/m² or less. The magnetic layer and the non-magnetic layer each preferably have a void of 30% by volume or less, still preferably 20% by volume or less. While a lower void is better for high output, there are cases in which a certain level of void is recommended. For instance, a relatively high void is often preferred for disk media, which put weight on durability against repeated use.

With respect to the 3D surface profile of the magnetic layer as measured on an assessment area of about 250 μm×250 μm with TOPO-3D (Wyko), the mean surface average roughness Ra is usually 4.0 nm or less, preferably 3.8 nm or less, still preferably 3.5 nm or less. The 3D surface profile preferably has a maximum height $R_{MAX}$ of 0.5 μm or smaller, a 10 point average roughness $R_z$ of 0.3 μm or smaller, a maximum mean surface-to-peak height $R_p$ of 0.3 μm or smaller, a maximum mean surface-to-valley depth $R_v$ of 0.3 μm or smaller, a mean surface area ratio Sr of 20 to 80%, and an average wavelength $\lambda_a$ of 5 to 300 μm. It is preferred to optimize the electromagnetic characteristics and the frictional coefficient of the magnetic layer by controlling the surface profile within the above-recited preferred ranges. A desired magnetic layer's surface profile is easily obtained by controlling the surface profile of the support (which can be done by means of a filler as previously mentioned), by adjusting the particle size and amount of powders used in the magnetic layer, and by selecting the surface profile of calendering rolls. Curling of the magnetic recording medium is preferably within ±3 mm.

Where the magnetic recording medium has a non-magnetic underlayer, it is easily anticipated that the physical properties are varied between the magnetic layer and the non-magnetic layer according to the purpose. For example, the elastic modulus of the magnetic layer can be set relatively high to improve running durability, while that of the non-magnetic layer can be set relatively low to improve head contact.

EXAMPLES

The present invention will now be illustrated in greater detail with reference to Examples, but it should be understood that the invention is not construed as being limited thereto. Unless otherwise noted, all the parts are by weight.

Example 1

| Magnetic coating composition: | |
|---|---|
| Barium ferrite magnetic powder | 100 parts |
| Average diameter: 30 nm; Average thickness: 10 nm; Average particle volume: 5800 nm³; Proportion of particles with average diameter of 10 nm or smaller: 6%; Hc: 183 kA/m; σs: 50 A · m²/kg; $S_{BET}$: 65 m²/g | |
| Vinyl chloride copolymer | 10 parts |
| MR110 (from Zeon Corp.) | |
| Polyurethane resin | 5 parts |
| Containing SO₃Na group; Tg: 82° C. | |
| α-Alumina | 5 parts |
| HIT55 (from Sumitomo Chemical Co., LTD.); average particle size: 0.2 μm | |
| Carbon black | 1 part |
| #55 (from Asahi Carbon Co., Ltd.); average particle size: 0.075 μm; specific surface area: 35 m²; DBP oil absorption: 81 ml/100 g; pH: 7.7; volatile content: 1.0% | |
| Butyl stearate | 10 parts |
| Butoxyethyl stearate | 5 parts |
| Isohexadecyl stearate | 3 parts |
| Stearic acid | 2 parts |
| Methyl ethyl ketone | 125 parts |
| Cyclohexanone | 125 parts |
| Non-magnetic coating composition: | |
| Non-magnetic powder (needle-like hematite) | 80 parts |
| Average major axis length: 0.15 μm; BET specific surface area: 50 m²/g; pH: 8.5; surface treatment layer: Al₂O₃ | |
| Carbon black | 20 parts |
| Average particle size: 20 nm | |
| Vinyl chloride copolymer | 7 parts |
| MR110 (from Zeon Corp.) | |

-continued

| | |
|---|---|
| Polyurethane resin<br>Containing SO₃Na group; Tg: 55° C. | 10 parts |
| Butyl stearate | 1 part |
| Stearic acid | 3 parts |
| Methyl ethyl ketone/cyclohexanone (8/2 (by weight)) | 250 parts |
| Backcoating composition: | |
| Non-magnetic powder (needle-line hematite)<br>Average length: 0.15 μm; BET specific surface area:<br>50 m²/g; pH: 8.5; surface treatment layer: Al₂O₃ | 80 parts |
| Carbon black<br>Average particle size: 20 nm | 20 parts |
| Carbon black<br>Average particle size: 100 nm | 3 parts |
| α-Al₂O₃<br>HIT55 (from Sumitomo Chemical); average particle size:<br>200 nm | 3 parts |
| Vinyl chloride copolymer<br>MR110 (from Zeon Corp.) | 7 parts |
| Polyurethane resin<br>Containing SO₃Na group; Tg: 55° C. | 10 parts |
| Stearic acid | 3 parts |
| Methyl ethyl ketone/cyclohexanone (8/2 (by weight)) | 250 parts |

The components of each coating composition were kneaded in a kneader and then dispersed in a sand mill for 4 hours. Polyisocyanate was added to the non-magnetic dispersion and the magnetic dispersion in an amount of 2.5 parts and 3 parts, respectively. Forty parts of cyclohexanone was added to each dispersion, followed by filtration through a filter having an average pore size of 1 μm to prepare a non-magnetic coating composition and a magnetic coating composition.

The resulting non-magnetic coating composition and magnetic coating composition were applied in this order almost simultaneously to a 4.4 μm thick Aramid film having a mean surface average roughness Ra of 2 nm to form a non-magnetic underlayer having a dry thickness of 1.7 μm and a magnetic layer having a dry thickness of 0.1 μm. While the two coating layers were wet, the magnetic layer was oriented with a cobalt magnet having a magnetic force of 0.6 T and a solenoid having a magnetic force of 0.6 T. After drying, the coated film was passed through a 7-roll calender, of which all the rolls were of metal, at 85° C. at a speed of 200 m/min. The backcoating composition was applied to the back of the film to a thickness of 0.5 μm. The coated film was slit into ½ in. wide strips. The strips were cleaned on a tape winding and unwinding device to which a nonwoven fabric and a razor blade were attached so as to be pressed onto the magnetic surface.

The resulting magnetic recording tape was evaluated for performance as follows.

1) Frictional Coefficient on the Back

A ¼ in. wide tape was slid 100 times on a pole of SUS420J under a load of 20 g at a speed of 14 mm/sec at 23° C. and 70% RH to measure the coefficient of friction of the back side of the tape.

2) Number of Depressions of 20 nm or Deeper

The depth and number of depressions on the magnetic layer over an area of a 90 μm side square were measured with an AFM in a contact mode. The depth of depressions was identified as a depth from the mean surface (the mean surface is a plane which divides the measured roughness curved surface into the peaks (above the plane) and the valleys (below the plane) whose total volumes are equal and the least)

3) Durability

A ¼ in. wide tape was slid 400 times on a pole of SUS420J under a load of 20 g at a speed of 14 mm/sec at 23° C. and 70% RH to measure the coefficient of friction of the back side of the tape, which was taken as a measure of durability.

4) Thickness of Backcoating Layer

A cut area of a medium was observed under a transmission electron microscope to obtain an average thickness of the backcoating layer.

Examples 2 to 5 and Comparative Examples 1 to 4

Magnetic tapes were prepared in the same manner as in Example 1, except for changing the fatty acid, non-magnetic powder and the conductive powder and the thickness of the backcoating layer as shown in Table 1 below.

TABLE 1

| | Example No. | | | | | Comparative Example No. | | | |
|---|---|---|---|---|---|---|---|---|---|
| | 1 | 2 | 3 | 4 | 5 | 1 | 2 | 3 | 4 |
| Backcoating Layer: | | | | | | | | | |
| Thickness (μm) | 0.4 | 0.2 | 0.8 | 0.4 | 0.4 | 0.4 | 0.4 | 0.4 | 0.4 |
| Projection Density<br>(/90 μm side square) | | | | | | | | | |
| Projection Height:<br>25–100 nm | 122 | 512 | 23 | 105 | 133 | 174 | 1908 | 112 | 156 |
| Projection Height:<br>>100 nm | 0 | 0 | 0 | 0 | 0 | 0 | 98 | 0 | 0 |
| Fatty Acid | | | | | | | | | |
| Kind | fatty acid | fatty acid ester | fatty acid | fatty acid | fatty acid | none | fatty acid ester | fatty acid | fatty acid |
| Fatty Acid Carbon Atom Number<br>of Fatty Acid<br>(moiety) | 18 | 18 | 18 | 12 | 26 | — | 18 | 30 | 8 |
| Content (wt %*) | 3 | 1.2 | 2.4 | 2 | 4.8 | 0 | 5.4 | 4.2 | 3.8 |
| Non-magnetic Powder | | | | | | | | | |
| Kind | hematite | goethite | hematite | goethite | hematite | goethite | hematite | hematite | hematite |
| Particle Size (nm) | 150 | 270 | 10 | 260 | 30 | 100 | 100 | 150 | 150 |

TABLE 1-continued

|  | Example No. | | | | | Comparative Example No. | | | |
| --- | --- | --- | --- | --- | --- | --- | --- | --- | --- |
|  | 1 | 2 | 3 | 4 | 5 | 1 | 2 | 3 | 4 |
| Conductive Powder | | | | | | | | | |
| Kind | carbon | carbon | carbon | carbon | carbon | carbon | carbon | carbon | carbon |
| Particle Size (nm) | 100 | 140 | 15 | 20 | 120 | 20 | 300 | 100 | 100 |
| Results of Evaluation: | | | | | | | | | |
| Frictional Coefficient of Backcoating Layer | 0.2 | 0.24 | 0.23 | 0.21 | 0.21 | 0.44 | 0.17 | 0.52 | 0.34 |
| Depressions ($\geqq 20$ nm)/ 90 $\mu$m side square | 34 | 102 | 8 | 28 | 38 | 85 | 402 | 33 | 51 |
| Durability ($\mu$) (400 P) | 0.34 | 0.32 | 0.36 | 0.36 | 0.29 | 0.76 | 0.44 | 0.56 | 0.6 |

Note:
*based on the backcoating layer

The magnetic recording medium according to the invention exhibits satisfactory electromagnetic characteristics in high-density recording regions and excellent durability.

This application is based on Japanese Patent application JP 2002-065445, filed Mar. 11, 2002, the entire content of which is hereby incorporated by reference, the same as if set forth at length.

What is claimed is:

1. A magnetic recording medium comprising:
    a magnetic layer comprising a ferromagnetic powder and a binder;
    a non-magnetic support; and
    a backcoating layer comprising a non-magnetic powder and a binder, in this order,
    wherein the backcoating layer comprises 0.3 to 5% by weight of at least one of a fatty acid having 10 to 26 carbon atoms and an ester thereof, the backcoating layer has projections having a height of 100 nm or smaller as measured with an atomic force microscope, and a density of projections on the backcoating layer which have a height of 25 to 100 nm as measured with an atomic force microscope is 1000 or fewer per 90 $\mu$m side square.

2. The magnetic recording medium according to claim 1, wherein the backcoating layer has a thickness of 0.1 to 1.0 $\mu$m.

3. The magnetic recording medium according to claim 2, wherein the non-magnetic powder has an average particle size of 5 to 300 nm.

4. The magnetic recording medium according to claim 3, wherein the backcoating layer further comprises an electrically conductive powder having an average particle size of 10 to 150 nm.

5. The magnetic recording medium according to claim 2, wherein the backcoating layer further comprises an electrically conductive powder having an average particle size of 10 to 150 nm.

6. The magnetic recording medium according to claim 1, wherein the non-magnetic powder has an average particle size of 5 to 300 nm.

7. The magnetic recording medium according to claim 6, wherein the backcoating layer further comprises an electrically conductive powder having an average particle size of 10 to 150 nm.

8. The magnetic recording medium according to claim 1, wherein the non-magnetic powder has an average particle size of 10 to 250 nm.

9. The magnetic recording medium according to claim 1, wherein the backcoating layer further comprises an electrically conductive powder having an average particle size of 10 to 150 nm.

10. The magnetic recording medium according to claim 9, wherein the electrically conductive powder is carbon black.

11. The magnetic recording medium according to claim 1, wherein the density is 500 or fewer per 90 $\mu$m side square.

12. The magnetic recording medium according to claim 1, wherein the non-magnetic powder is an inorganic powder.

13. The magnetic recording medium according to claim 1, wherein the inorganic powder comprises an inorganic powder having a Mohs hardness of 5 to 9.

14. The magnetic recording medium according to claim 13, wherein the inorganic powder having a Mohs hardness of 5 to 9 comprises $\alpha$-iron oxide, $\alpha$-alumina, or chromium oxide.

* * * * *